(12) United States Patent
Scharp

(10) Patent No.: US 9,308,607 B2
(45) Date of Patent: Apr. 12, 2016

(54) METHOD FOR PRODUCING A PISTON FOR AN INTERNAL COMBUSTION ENGINE

(71) Applicant: MAHLE International GmbH, Stuttgart (DE)

(72) Inventor: Rainer Scharp, Vaihingen (DE)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 14/398,787

(22) PCT Filed: May 3, 2013

(86) PCT No.: PCT/DE2013/000241
§ 371 (c)(1),
(2) Date: Nov. 12, 2014

(87) PCT Pub. No.: WO2013/167105
PCT Pub. Date: Nov. 14, 2013

(65) Prior Publication Data
US 2015/0135533 A1 May 21, 2015

(30) Foreign Application Priority Data
May 5, 2012 (DE) .......................... 10 2012 008 947

(51) Int. Cl.
*B23P 15/10* (2006.01)
*B23K 20/12* (2006.01)
(Continued)

(52) U.S. Cl.
CPC ................. *B23P 15/10* (2013.01); *B23K 20/12* (2013.01); *B23K 20/129* (2013.01);
(Continued)

(58) Field of Classification Search
CPC .... B23P 15/10; B23P 19/042; B23P 2700/50; B23K 20/129; B23K 20/227; B23K 20/12; B23K 2203/04; B23K 2201/006; B23K 2201/003; Y10T 29/49256; F02F 3/22
See application file for complete search history.

(56) References Cited

U.S. PATENT DOCUMENTS

| 8,635,982 B2 | 1/2014 | Scharp et al. |
| 2011/0107997 A1 | 5/2011 | Muscas et al. |
| 2012/0037113 A1 | 2/2012 | Scharp et al. |

FOREIGN PATENT DOCUMENTS

| DE | 10 2010 033 881 A1 | 2/2012 |
| DE | 10 2011 100 521 A1 | 2/2012 |

OTHER PUBLICATIONS
International Search Report of PCT/DE2013/000241, mailed Aug. 27, 2013.
(Continued)

*Primary Examiner* — Ryan J Walters
(74) *Attorney, Agent, or Firm* — Collard & Roe, P.C.

(57) ABSTRACT

The invention relates to a method for producing a piston (10, 110) for an internal combustion engine, having a main piston body (11, 111) and a piston ring element (12, 112), wherein the main piston member (11, 111) comprises at least one piston skirt (15, 115) and at least one bottom region (27, 127) of a combustion recess (21, 121). The piston ring element (12, 112) comprises a piston crown (19, 119), at least one wall region (28, 28) of the combustion recess (21, 121), a circumferential fire land (22, 122) and at least one part of a circumferential ring part (23, 123) provided with annular grooves. The main piston body (11, 111) and the piston ring element (12, 112) form a circumferential closed cooling duct (24, 124). The method is characterized by the following method steps: (a) providing a blank (11', 111', 211') of the main piston body (11, 111), in which an outer circumferential joining surface (29, 129, 229) and an inner circumferential joining surface (31, 131, 231), which is widened in the direction of the bottom region (27, 127) of the combustion recess (24, 124), as well as a circumferential lower cooling duct part (24a, 124a, 224a) between the two joining surfaces (29, 31; 129, 131; 229, 231) are rough-machined, (b) providing a blank (12', 112', 212') of the piston ring element (12, 112) in which an outer annular joining surface (32, 132, 232) and an inner annular joining surface (33, 133, 233) as well as a circumferential upper cooling duct part (24b, 124b, 224b) between the two joining surfaces (32, 33; 132, 133; 232, 233) are rough-machined, (c) joining the blank (11', 111', 211') to the blank (12', 112', 212') via the joining surfaces (29, 129, 229; 31, 131, 231; 32, 132, 232; 33, 133, 232) thereof in order to form a piston blank (10', 110') in such a manner that at least in the bottom region (27, 127) of the combustion recess (24, 124) a sub-region (34, 134, 234) of the widened joining surface (31, 131, 231) of the blank (11', 111', 211') remains blank, (d) post-machining and/or finishing the piston blank (10', 110') to form a piston (10, 110) whilst removing the sub-region (34, 134, 234) of the widened joining surface (31, 131, 231).

8 Claims, 4 Drawing Sheets

Figure 1:
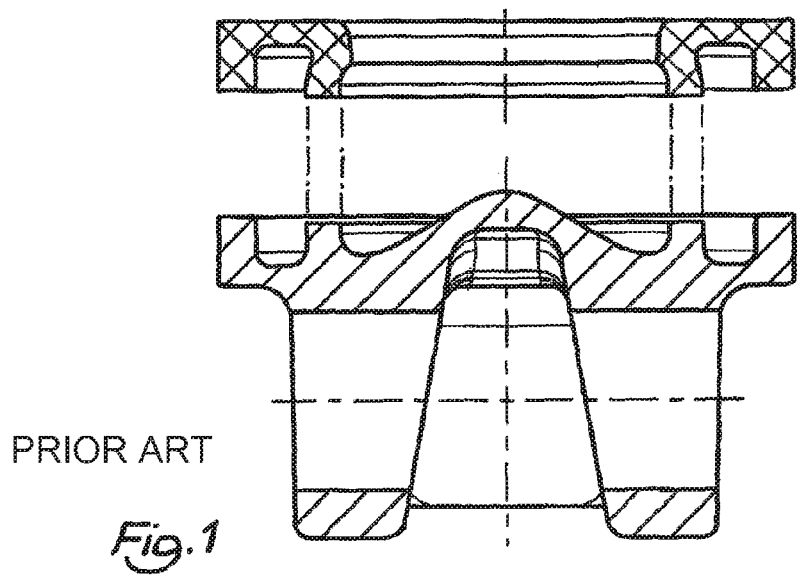

(51) Int. Cl.
  *B23K 20/227* (2006.01)
  *B23P 19/04* (2006.01)
  *F02F 3/22* (2006.01)
(52) U.S. Cl.
  CPC ............ *B23K 20/227* (2013.01); *B23P 19/042* (2013.01); *B23K 2201/003* (2013.01); *B23K 2201/006* (2013.01); *B23K 2203/04* (2013.01); *B23P 2700/50* (2013.01); *F02F 3/22* (2013.01); *Y10T 29/49256* (2015.01)

(56) References Cited

OTHER PUBLICATIONS

German Search Report in German Application No. 10 2012 008 947.3 dated Apr. 12, 2013, with an English translation of the relevant parts of same.

METHOD FOR PRODUCING A PISTON FOR AN INTERNAL COMBUSTION ENGINE

CROSS REFERENCE TO RELATED APPLICATIONS

This application is the National Stage of PCT/DE2013/000241 filed on May 3, 2013, which claims priority under 35 U.S.C. §119 of German Application No. 10 2012 008 947.3 filed on May 5, 2012, the disclosures of which are incorporated by reference. The international application under PCT article 21(2) was not published in English.

The present invention relates to a method for production of a piston for an internal combustion engine, having a basic piston body and a piston ring element, wherein the basic piston body has at least a piston skirt and at least a bottom region of a combustion bowl, wherein the piston ring element has a piston crown, at least one wall region of the combustion bowl, a circumferential top land, and at least one part of a circumferential ring belt provided with ring grooves, and wherein the basic piston body and the piston ring element form a circumferential closed cooling channel.

A piston of the stated type is known, for example, from the published patent application US 2011/0107997 A1. Such pistons can have very flat and large combustion bowls, particularly if they are produced for utility vehicles. The blanks of the basic piston body and of the piston ring element are preferably produced by means of a forging method, for one thing, and for another, they are preferably joined by means of a friction-welding method, whereby friction-welding beads form along the joining seams. In the case of pistons having flat and large combustion chamber bowls, however, it is difficult to form a joining surface by means of a forging method, which surface is essentially equal to a pipe end and corresponds to the joining surface of the piston ring body.

The task of the present invention consists in making available a production method for a piston of the stated type, which method makes it possible to produce the blanks for all construction forms of basic piston body and piston ring element by means of a forging method, and which, at the same time, allows the use of a friction-welding method for joining of the blanks.

The solution consists in a method having the following steps: (a) making available a blank of the basic piston body, in which an outer circumferential joining surface and an inner circumferential joining surface, widened in the direction of the bottom region of the combustion bowl, as well as a lower cooling channel part that runs circumferentially between the two joining surfaces are pre-machined; (b) making available a blank of the piston ring element, in which an outer ring-shaped joining surface and an inner ring-shaped joining surface as well as an upper cooling channel part that runs circumferentially between the two joining surfaces are pre-machined; (c) joining of the blank with the blank by way of their joining surfaces, to produce a piston blank, in such a manner that a partial region of the widened joining surface of the blank remains standing free, at least in the bottom region of the combustion bowl; (d) post-machining and/or finishing of the piston blank to produce a piston, with removal of the part of the widened joining surface.

The idea according to the invention consists in widening the joining surface of the blank of the basic piston body in the direction of the combustion bowl. This joining surface is therefore dimensioned to be larger than the corresponding inner joining surface of the blank of the piston ring element. It is no longer equal to a pipe end, as before, but rather is configured essentially as a ring plate and therefore significantly less delicate than is the case in the state of the art up to the present. This structurally simple configuration of the inner circumferential joining surface of the blank of the basic piston body permits producing the blank by means of a forging method. At the same time, the method according to the invention permits joining the blanks by means of a friction-welding method, because the friction-welding bead that occurs in the region of the combustion bowl in this connection can widen above the free-standing remaining joining surface and can be removed, in simple manner, during post-machining or finishing. Finally, the method according to the invention permits machining the combustion bowl to be deeper, subsequently, if this is practical or desirable. Therefore pistons having combustion bowls configured to have different depths can be produced for the basic piston body, using the same blanks. This makes it possible to improve the efficiency of the production of the piston blanks, and thereby to lower the production costs.

Advantageous further developments are evident from the dependent claims.

Preferably, in step (a) or step (b), the blank and/or the blank is produced by means of a forging method and subsequently pre-machined. Furthermore, in step (c) the blank is preferably joined to the blank by means of a friction-welding method, with the formation of at least one friction-welding seam. These production methods are particularly common and have proven themselves for a long time.

A particularly preferred further development provides that before joining by means of a friction-welding method, before step (c), circumferential widened regions are made on the inner and outer joining surface of the blank and/or on the inner and outer joining surface of the blank. The joining surfaces are therefore configured in such a manner that a region of the joining surfaces can take up excess material during friction welding. The typical rolled-in friction-welding beads therefore cannot occur.

The widened regions can be shaped in any desired manner, for example in the form of a slanted surface, a bevel or a bowl. The widened regions can be shaped, for example, with an axial expanse of 1.0 mm to 1.5 mm and/or with a radial expanse of at least 0.5 mm.

It is practical if the blanks are produced from a quenched and tempered steel or a precipitation-hardened steel. In this case, it is particularly advantageous if the blanks are quenched and tempered before step (c) and joined, in step (c), with the formation of a heat influence zone in the region of the at least one friction-welding seam (35, 36, 135, 136), and, after step (c), the resulting piston blank is heat-treated by means of tempering or stress-relief annealing, thereby obtaining (a) heat influence zone(s). In this method, hardening of the material of the blanks takes place in known manner, in the immediate vicinity of the friction-welding seams. This hardness increases by up to 400 HV (Vickers) in this region. This hardened region is referred to as a "heat influence zone." The heat influence zone is harder than the quenched and tempered material of the piston blank outside of the heat influence zone. Quenching and tempering after joining by means of friction-welding is no longer required. Instead, the piston blank resulting from friction-welding is only subjected to tempering or stress-relief annealing, in order to reduce any stresses that might be present. In this connection, the hardness in the heat influence zone decreases slightly, but increased hardening with a hardness of up to 200 HV (Vickers) remains. Because the hardness of the quenched and tempered material of the piston blank also decreases slightly outside of the heat influence zone, as the result of tempering or stress-relief annealing, the heat influence zone is essentially maintained. The heat influence zone in the finished piston is therefore a region around the friction-welding seam, which region demonstrates a greater Vickers hardness than the remaining material of the piston.

This heat influence zone can be used for partial regions or partial structures of the piston that are subject to greater wear. For this purpose, the friction-welding seam or the joining surfaces of the blanks of the piston components to be connected by means of friction welding are positioned in such a manner that the partial regions or partial structures of the piston to be produced, which are subject to greater wear and are therefore supposed to be hardened, lie in the heat influence zone after friction welding. As a result, it is no longer necessary to subject these partial regions or partial structures to a separate hardening process, such as nitriding or laser beam treatment.

Figure 2:
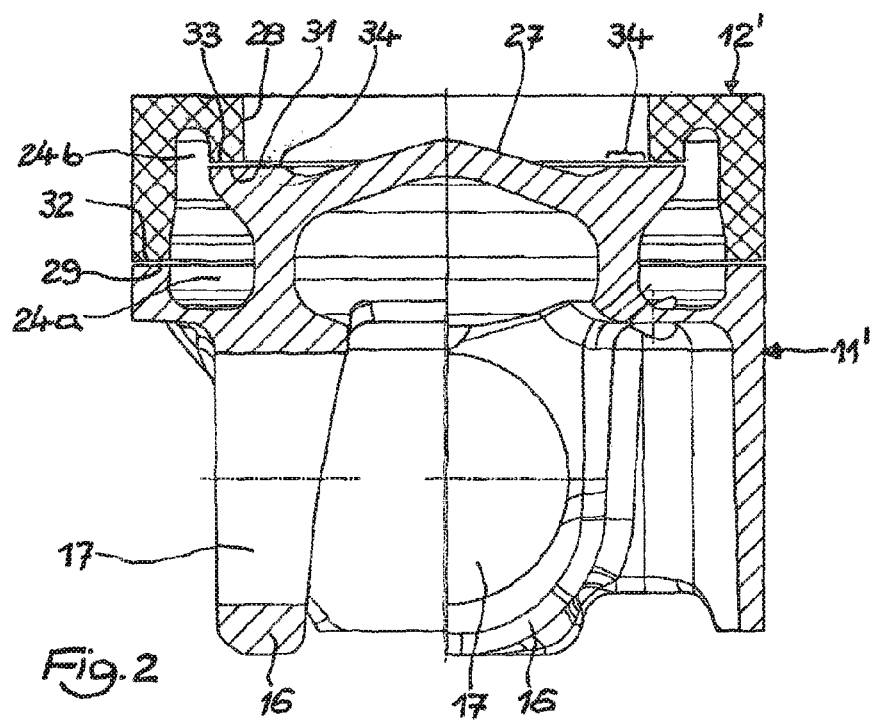
Figure 3:
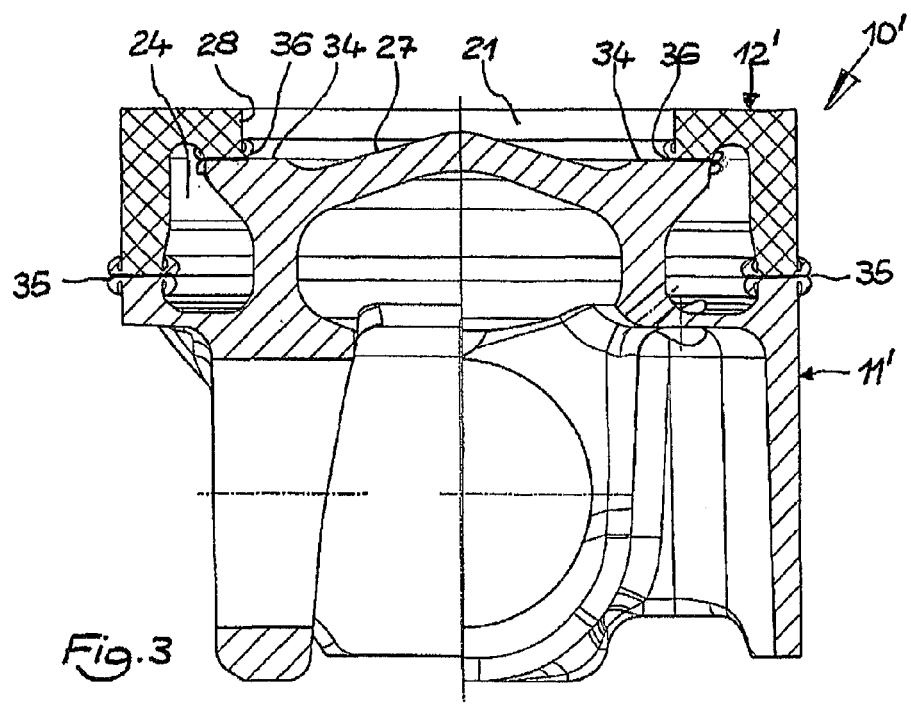
Figure 4:
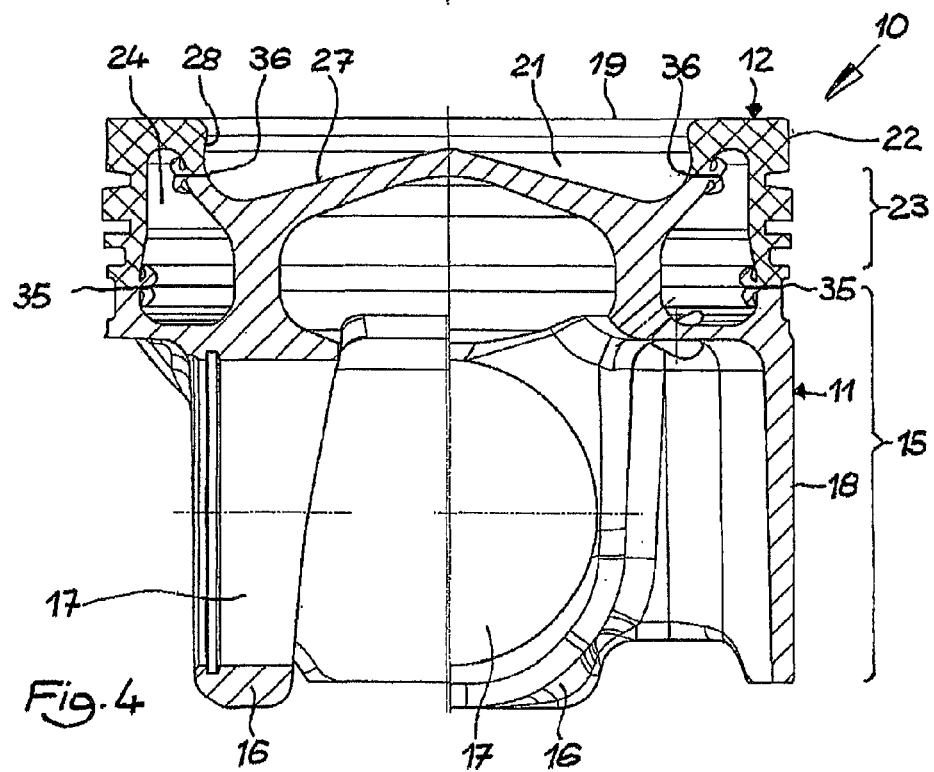
Figure 5:
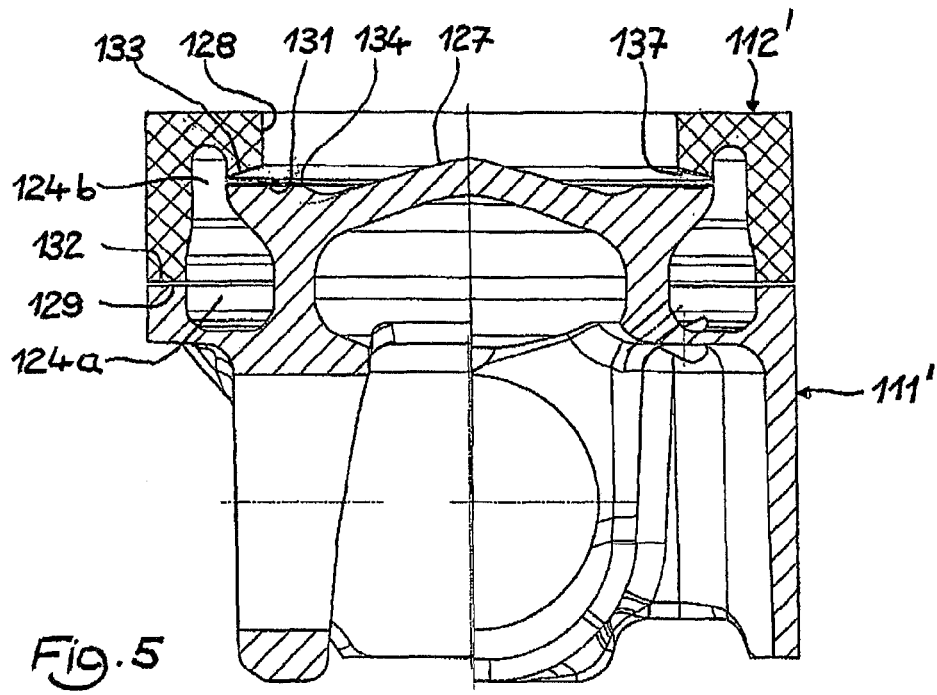
Figure 6:
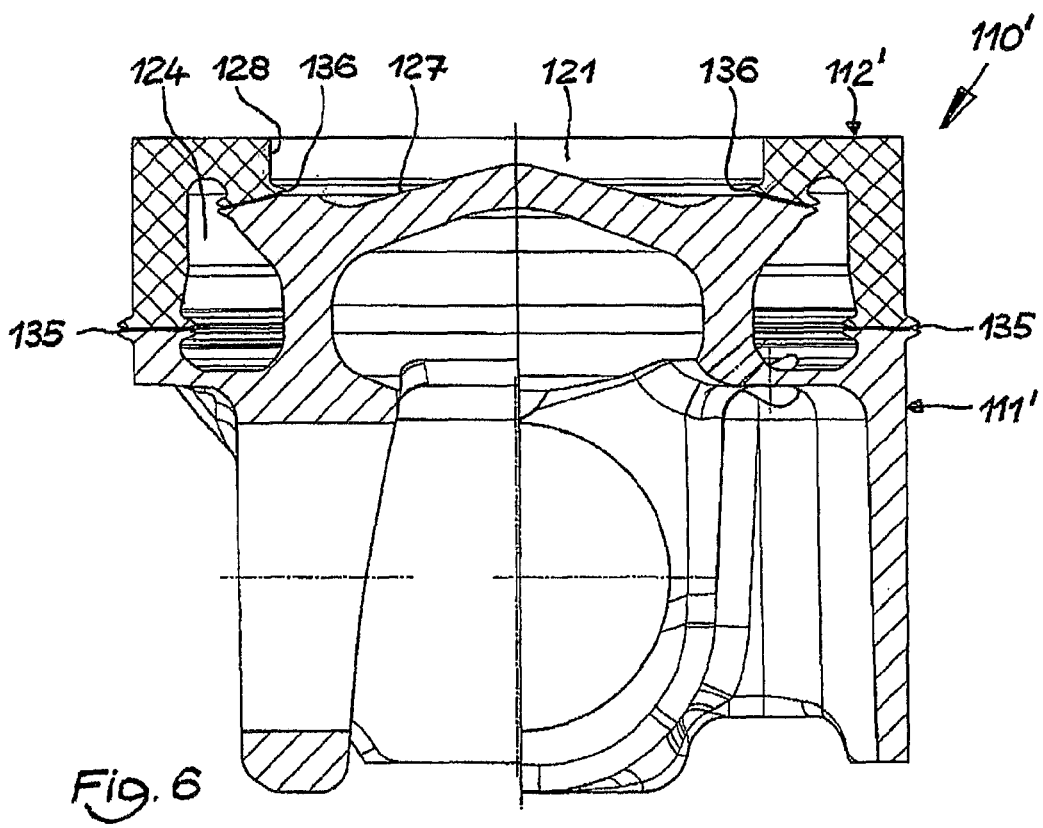
Figure 7:
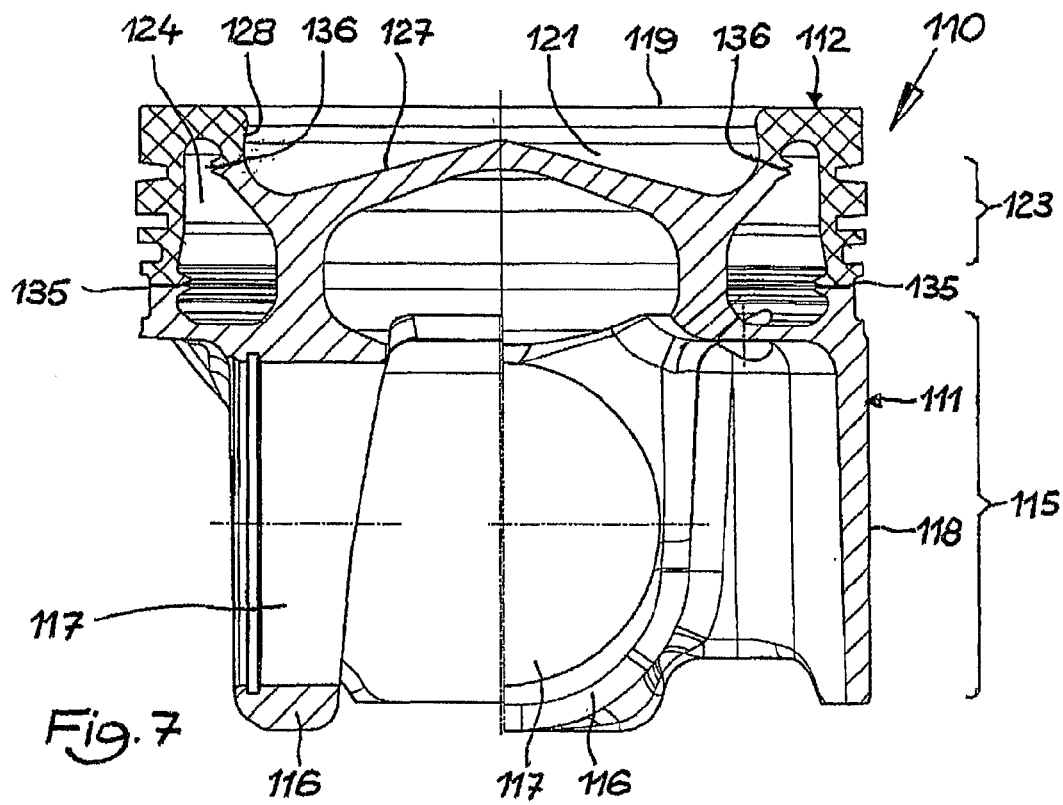
Figure 8:
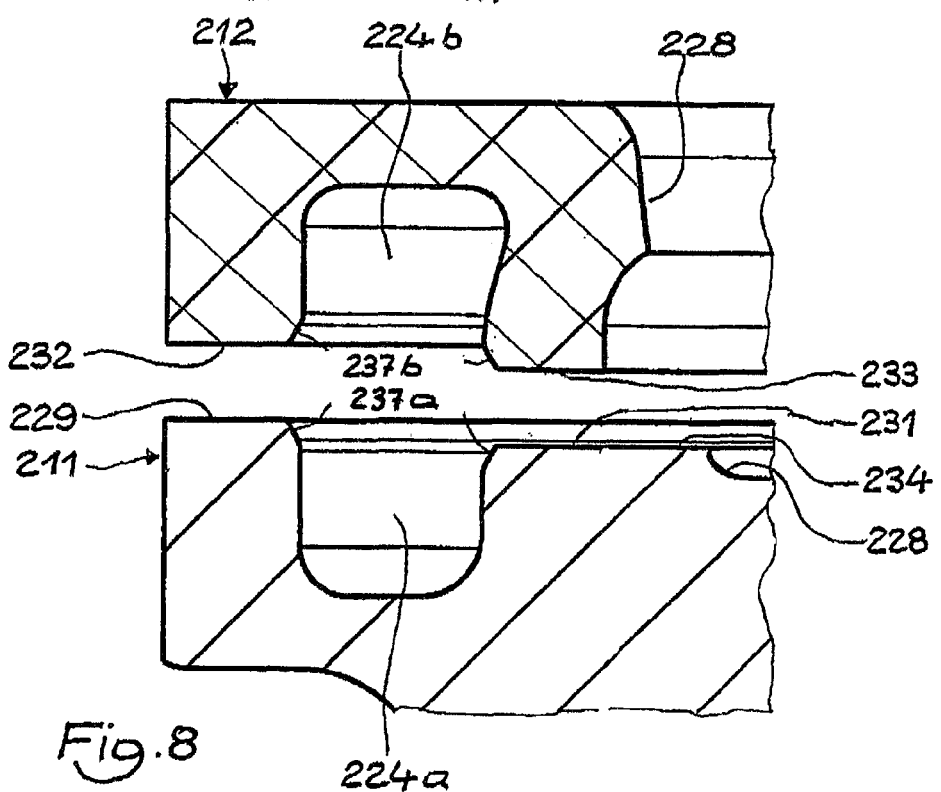

Exemplary embodiments of the present invention will be explained in greater detail below, using the attached drawings. These show, in a schematic representation, not true to scale:

FIG. 1 an exemplary embodiment of blanks for the production of a piston of the stated type, according to the state of the art;

FIG. 2 a first exemplary embodiment of blanks, from which a piston is produced in accordance with the method according to the invention, whereby the right half of the figure is rotated by 90° as compared with the left half;

FIG. 3 a first exemplary embodiment of a piston blank joined by means of a friction welding method, from the blanks according to FIG. 2, whereby the right half of the figure is rotated by 90° as compared with the left half;

FIG. 4 a first exemplary embodiment of a finished piston produced from the piston blank according to FIG. 3, whereby the right half of the figure is rotated by 90° as compared with the left half;

FIG. 5 a further exemplary embodiment of blanks, from which a piston is produced in accordance with the method according to the invention, whereby the right half of the figure is rotated by 90° as compared with the left half;

FIG. 6 a further exemplary embodiment of a piston blank joined by means of a friction welding method, from the blanks according to FIG. 5, whereby the right half of the figure is rotated by 90° as compared with the left half;

FIG. 7 a further exemplary embodiment of a finished piston produced from the piston blank according to FIG. 6, whereby the right half of the figure is rotated by 90° as compared with the left half;

FIG. 8 an enlarged partial representation of a further exemplary embodiment of blanks from which a piston is produced in accordance with the method according to the invention.

FIGS. 4 and 7 show a finished piston 10, 110, which was produced in accordance with the method according to the invention, by means of a friction-welding method. The piston 10, 110 consists of a basic piston body 11, 111 and a piston ring element 12, 112. The two components can consist of any metallic material that is suitable for friction-welding, and are connected with one another by way of friction-welding seams 35, 36, 135, 136.

In the exemplary embodiment, the basic piston body consists of a steel material, for example 42CrMo4. The basic piston body 11, 111 has a piston skirt 15, 115, which is provided, in known manner, with pin bosses 16, 116 and pin bores 17, 117 for accommodating a piston pin (not shown), as well as working surfaces 18, 118. In the exemplary embodiment, the piston ring element 12, 112 is also produced from a steel material, for example 38MnVS6. The piston ring element 12, 112 has a piston crown 19, 119 having a combustion bowl 21, 121, as well as a circumferential top land 22, 122 and a circumferential ring belt 23, 123 for accommodating piston rings (not shown). The basic piston body 11, 111 and the piston ring element 12, 112 together form a circumferential closed cooling channel 24, 124.

The piston 10 according to FIG. 4 is produced by means of the method according to the invention as described below.

According to FIG. 2, first a pre-machined blank 11' of a basic piston body 11 as well as a pre-machined blank 12' of a piston ring element 12 are produced. The blanks 11', 12' are produced by means of a forging method in the exemplary embodiment. Subsequently the blanks 11', 12' are pre-machined. In this connection, the bottom region 27 of the combustion bowl 21 was machined, for example lathed into the blank 11' in the exemplary embodiment. Furthermore, a circumferential lower cooling channel part 24a of the cooling channel 24 was pre-machined.

This results in an outer circumferential joining surface 29 and an inner circumferential joining surface 31. According to the invention, the inner joining surface 31 is widened in the direction of the bottom region 27, as is particularly clearly evident from a comparison with the piston blank according to the state of the art shown in FIG. 1.

In the exemplary embodiment, the wall region 28 of the combustion bowl 21 is machined, for example lathed into the blank 12'. Furthermore, a circumferential upper cooling channel part 24b of the cooling channel 24 has been machined in. This results in an outer circumferential joining surface 32 and an inner circumferential joining surface 33. The outer joining surface 29 of the blank 11' corresponds to the outer joining surface 32 of the blank 12'. In corresponding manner, the inner, widened joining surface 31 of the blank 11' corresponds to the inner joining surface 33 of the blank 12'. This means that the two blanks 11', 12' can be connected with one another along their joining surfaces 29, 31 and 32, 33, respectively, to produce a piston blank 10'.

As is clearly evident in FIG. 2, particularly in comparison with the state of the art according to FIG. 1, the inner, widened joining surface 31 of the blank 11' and the inner joining surface 33 of the blank 12' correspond to one another, according to the invention, in such a manner that a partial region 34 of the joining surface 31, directed toward the bottom region 27 of the combustion bowl 21, remains standing free.

To connect the two blanks 11', 12', these are braced to align with one another, in known manner, and joined by means of a friction-welding method. An exemplary embodiment of a friction-welding method provides that one of the two blanks 11', 12' is put into rotation until a speed of rotation of 1,500 rpm to 2,500 rpm is reached. Now the blanks 11', 12' are brought into contact with one another by way of their joining surfaces 29, 31 and 32, 33, respectively, and pressed together under a press-down pressure, with reference to the joining surface 29, 31, and 32, 33, of 10 N/mm² to 30 N/mm². The rotational movement and the press-down pressure produce a friction that heats up the joining surfaces 29, 31, and 32, 33. The speed of rotation and the press-down pressure are selected as a function of the materials used, in such a manner that the joining surfaces 29, 31 and 32, 33 heat up to a temperature close to the melting point of the material or the materials. Once this is reached (after 1 to 3 seconds, depending on the material or materials), the rotation is stopped, while maintaining the press-down pressure, i.e. the clamping apparatus is braked and stopped as quickly as possible (if at all possible within less than 1 second). During this procedure, the press-down pressure is maintained. After stopping has occurred, the press-down pressure is increased to a joining pressure, with reference to the joining surfaces 29, 31 and 32, 33, of 100 N/mm² to 140 N/mm², and the blanks 11', 12' are pressed together at this joining pressure for about 5 seconds.

FIG. 3 shows the piston blank 10' produced in this manner. The piston blank 10' has friction-welding seams 35, 36 as the result of the friction-welding procedure described above.

The piston blank 10' is post-machined or finished in known manner, depending on the configuration of the blanks 11', 12'. For example, the outer shape, surfaces, combustion bowl, ring belt, pin bores, etc. can be machined to finish them. According to the invention, the free-standing partial region 34 of the joining surface 31 is removed, preferably by means of lathing it out. During the course of this method step, the bottom region 27 and the wall region 28 of the combustion bowl 21 are machined to finish them. In this connection, the depth of the combustion bowl 21 can be freely selected during the course of removal of the partial region 34 of the joining surface 31. Therefore pistons 10 having combustion bowls 21 of different depths can be produced using blanks 11' of the same construction for the basic piston body 11. In the end result, the finished piston 10 according to FIG. 4, as described above, is obtained.

The blanks 11', 12' can be produced from a quenched and tempered steel or a precipitation-hardened steel and quenched and tempered before joining. During joining, a heat influence zone forms, in each instance, around the friction-welding seams 35, 36 that have formed. The heat influence zones extend above and below the friction-welding seams 35, 36, over about 1 to 3 mm, in each instance. In the region of the heat influence zones, the hardness of the material is increased by about 400 HV (Vickers) as compared with the quenched and tempered material of the blanks 11', 12' outside of the heat influence zones. The resulting piston blank 10' is then subjected to heat treatment after friction welding, namely to tempering or stress-relief annealing. This heat treatment leads to the result that the hardness of the material is reduced by about 200 HV (Vickers) not only in the heat influence zones but also outside of the heat influence zones. The difference in hardness between the harder heat influence zones and the remaining material of the blanks 11', 12' is therefore permanently maintained.

FIG. 5 shows another exemplary embodiment of a blank 111' of a basic piston body 111 as well as of a blank 112' of a piston ring element 112 for a piston 110 according to the invention. In the exemplary embodiment, the blanks 111', 112' are produced by means of a forging method. Subsequently, the blanks 111', 112' were pre-machined. In this connection in the exemplary embodiment, the bottom region 127 of the combustion bowl 121 was machined into the blank 111', for example lathed in. Furthermore, a circumferential lower cooling channel part 124a of the cooling channel 124 was pre-machined. This results in an outer circumferential joining surface 129 and an inner circumferential joining surface 131. According to the invention, the inner joining surface 131 is widened in the direction of the bottom region 127, as is particularly clearly evident from the comparison with the piston blank according to the state of the art shown in FIG. 1.

In the exemplary embodiment, the wall region 128 of the combustion bowl 121 is machined, for example lathed into the blank 112'. Furthermore, a circumferential upper cooling channel part 124b of the cooling channel 124 is machined in. This results in an outer circumferential joining surface 132 and an inner circumferential joining surface 133. The outer joining surface 129 of the blank 111' corresponds to the outer joining surface 132 of the blank 112'. In corresponding manner, the inner, widened joining surface 131 of the blank 111' corresponds to the inner joining surface 133 of the blank 112'. This means that the two blanks 111', 112' can be connected with one another along their joining surfaces 129, 131 and 132, 133, respectively, to form a piston blank 110'.

As is clearly evident in FIG. 5, particularly in comparison with the state of the art according to FIG. 1, the inner, widened joining surface 131 of the blank 111' and the inner joining surface 133 of the blank 112' correspond to one another, according to the invention, in such a manner that a partial region 134 of the joining surface 131, directed toward the bottom region 127 of the combustion bowl 121, remains standing free.

In this exemplary embodiment, a circumferential widened region 137 in the form of a slant is formed on the inner joining surfaces 133 of the blank 112' of the piston ring element 112, in each instance. The widened region 137 opens in the direction of the bottom region 127 of the combustion bowl 121. The maximal axial expanse of the widened region 137 amounts to about 1 mm, in each instance, in the exemplary embodiment. When the joining surfaces 129, 131 and 132, 133 of the blanks 111', 112' come into contact with one another at the beginning of the friction-welding procedure described above, the widened regions 137 in the exemplary embodiment form a free space in the form of a right-angled triangle having a maximal axial expanse of about 1 mm, in which the molten material is distributed. In this connection, the excess material is accommodated in the joins described above. Of course, widened regions having different geometry can also be combined with one another.

The blanks 111, 112 are joined by means of the friction-welding method described above. FIG. 6 shows the piston blank 110' produced in this manner. The piston blank 110' has friction-welding seams 135, 136 as the result of the friction-welding procedure described above. It can furthermore be derived from FIG. 6 that no friction-welding beads, as they are shown in FIG. 3, have been formed along the friction-welding seams 135, 136. The excess material melted during the friction-welding procedure described above was accommodated by the free space formed from the widened region 137 during the friction-welding procedure.

The piston blank 110' is post-machined or finished in known manner, depending on the configuration of the blanks 111', 112'. For example, the outer shape, surfaces, combustion bowl, ring belt, pin bosses, etc. can be machined to finish them. According to the invention, the free-standing partial region 134 of the joining surface 131 is removed, preferably by means of lathing it out. During the course of this method step, the bottom region 127 and the wall region 128 of the combustion bowl 121 are machined to finish them. In this connection, the depth of the combustion bowl 121 can be freely selected during the course of removal of the partial region 134 of the joining surface 131. Therefore pistons 110 having combustion bowls 121 of different depths can be produced using blanks 111' of the same construction for the basic piston body 111. In the end result, the finished piston 110 according to FIG. 7, as described above, is obtained.

FIG. 8 shows an enlarged partial representation of a further exemplary embodiment of blanks 211, 212, from which a piston is produced in accordance with the method according to the invention. In this exemplary embodiment, a circumferential widened region 237a, 237b, in each instance, in the form of a bevel, is formed on the two joining surfaces 229, 231 of the blank 211' and on the two joining surfaces 232, 233 of the blank 212'. The widened regions 237a extend in the direction of the cooling channel part 224a of the blank 211'. In corresponding manner, the widened regions 237b extend in the direction of the cooling channel part 224b of the blank 212'. The maximal axial expanse of the widened regions 237a, 237b amounts to about 1.0 mm, in each instance, in the exemplary embodiment, while the radial expanse of the widened regions 237a, 327b amounts to about 0.5 mm, in each instance. When the joining surfaces 229, 131 and 232, 233 of the blanks 211', 212' come into contact with one another at the beginning of the friction-welding procedure described above, the widened regions 237a, 237b in the exemplary embodiment form two joins that lie opposite one another, having a maximal axial expanse of about 2 mm, which can accommodate excess material. Of course, widened regions having different geometry can also be combined with one another.

The invention claimed is:

1. Method for production of a piston (10, 110) for an internal combustion engine, having a basic piston body (11, 111) and a piston ring element (12, 112), wherein the basic piston body (11, 111) has at least a piston skirt (15, 115) and at least a bottom region (27, 127) of a combustion bowl (21, 121), wherein the piston ring element (12, 112) has a piston crown (19, 119), at least one wall region (28, 128) of the combustion bowl (21, 121), a circumferential top land (22, 122), and at least one part of a circumferential ring belt (23, 123) provided with ring grooves, and wherein the basic piston body (11, 111) and the piston ring element (12, 112) form a circumferential closed cooling channel (24, 124), comprising the following method steps:
   (a) providing a first blank (11', 111', 211') of the basic piston body (11, 111), in which an outer circumferential joining surface (29, 129, 229) and an inner circumferential joining surface (31, 131, 231), widened in the direction of the bottom region (27, 127) of the combustion bowl (24, 124), as well as a lower cooling channel part (24a, 124a, 224a) that runs circumferentially between the two joining surfaces (29, 31; 129, 131; 229, 231) are pre-machined;
   (b) providing a second blank (12', 112', 212') of the piston ring element (12, 112), in which an outer ring-shaped joining surface (32, 132, 232) and an inner ring-shaped joining surface (33, 133, 233) as well as an upper cooling channel part (24b, 124b, 224b) that runs circumferentially between the two joining surfaces (32, 33; 132, 133; 232, 233) are pre-machined;
   (c) joining the first blank (11', 111', 211') with the second blank (12', 112', 212') by way of their joining surfaces (29, 129, 229; 31, 131, 231; 32, 132, 232; 33, 133, 233), to produce a piston blank (10', 110'), in such a manner that a partial region (34, 134, 234) of the widened joining surface (31, 131, 231) of the first blank (11', 111', 211) remains standing free and uncovered by the second blank, at least in the bottom region (27, 127) of the combustion bowl (24, 124);
   (d) post-machining and/or finishing the piston blank (10', 110') to produce a piston (10, 110), including removal of the partial region (34, 134, 234) of the widened joining surface (31, 131, 231).

2. Method according to claim 1, wherein in step (a) or step (b), the first blank (11', 111', 211') and/or the second blank (12', 112', 212') is/are produced by means of a forging method and subsequently pre-machined.

3. Method according to claim 1, wherein in step (c), the first blank (11', 111', 211') is joined to the second blank (12', 112', 212') by means of a friction-welding method, including the formation of at least one friction-welding seam (35, 36, 135, 136).

4. Method according to claim 3, wherein before step (c), circumferential widened regions (137; 237a, 237b) are made on the inner and/or outer joining surface (133, 229, 231, 232, 233) of the first blank (111', 211') and/or of the second blank (112', 212').

5. Method according to claim 4, wherein the at least one circumferential widened region (137; 237a, 237b) is shaped in the form of a slanted surface, a bevel or a bowl.

6. Method according to claim 4, wherein the circumferential widened regions (137; 237a, 237b) are shaped with an axial expanse of 1.0 mm to 1.5 mm and/or with a radial expanse of at least 0.5 mm.

7. Method according to claim 3, wherein the first blank (11', 111, 211') and the second blank (12', 112', 212') are produced from a quenched and tempered steel or a precipitation-hardened steel.

8. Method according to claim 7, wherein the first and second blanks (11', 111', 211', 12' 112', 212') are quenched and tempered before step (c), that the first and second blanks (11', 111', 211', 12' 112', 212') are joined, in step (c), including the formation of a heat influence zone in the region of the at least one friction-welding seam (35, 36, 135, 136), and that after step (c), the piston blank (10', 110') is heat-treated by means of tempering or stress-relief annealing, thereby obtaining the heat influence zone(s).

* * * * *